United States Patent [19]
Mack et al.

[11] Patent Number: 5,673,385
[45] Date of Patent: Sep. 30, 1997

[54] METHOD FOR DOWNLOADING SPECIAL CODE FROM A COMPUTER TO A HARD COPY APPARATUS

[75] Inventors: Dale A. Mack; William E. Egbert, both of Boise, Id.

[73] Assignee: Hewlett-Packard Company, Palo Alto, Calif.

[21] Appl. No.: 785,026

[22] Filed: Jan. 16, 1997

Related U.S. Application Data

[63] Continuation of Ser. No. 543,835, Oct. 16, 1995, abandoned, which is a continuation of Ser. No. 260,122, Jun. 15, 1994, abandoned.

[51] Int. Cl.$^6$ ............................................. G06F 11/00
[52] U.S. Cl. ................................. 395/183.2; 395/183.12
[58] Field of Search ............................ 395/183.2, 183.12, 395/183.08, 183.13, 183.16, 835

[56] References Cited

U.S. PATENT DOCUMENTS

| | | | |
|---|---|---|---|
| 4,538,267 | 8/1985 | Uchida | 371/16.4 |
| 4,694,408 | 9/1987 | Zaleski | 371/16.4 |
| 4,742,483 | 5/1988 | Morrell | 371/16.4 |
| 4,745,602 | 5/1988 | Morrell | 371/16.4 |
| 4,837,764 | 6/1989 | Russello | 371/15.1 |
| 5,111,457 | 5/1992 | Rabjohns et al. | 371/16.4 |
| 5,136,713 | 8/1992 | Bealkowski et al. | 395/700 |
| 5,138,618 | 8/1992 | Honda et al. | 371/16.4 |
| 5,210,875 | 5/1993 | Bealkowski et al. | 395/700 |
| 5,355,489 | 10/1994 | Bealkowski et al. | 395/700 |
| 5,367,472 | 11/1994 | Khashayor | 371/15.1 |
| 5,438,528 | 8/1995 | Emerson et al. | 395/185.09 |

*Primary Examiner*—Robert W. Beausoliel, Jr.
*Assistant Examiner*—Joseph E. Palys

[57] ABSTRACT

The present invention provides a process for loading an off-board program into a computer peripheral apparatus connected to a host computer via a standard interface port. Random access memory of the peripheral apparatus is used by the host computer. The process includes the steps of: applying power to the apparatus, initializing the apparatus to achieve minimal operational conditions, polling the interface port for a signal indicative of a host computer to peripheral apparatus program download request. Upon receiving the download request, the peripheral apparatus configures the random access memory to receive the program via the interface port, then provides a signal indicative of readiness to receive the program. The program can then be downloaded from the host, received in the random access memory, and run. If the download request is not recognized, the apparatus is fully initialized to its normal state of readiness for receiving common commands from the host computer. Substantially the same process can be used for upgrading other programmable memories of computer peripheral apparatus.

19 Claims, 4 Drawing Sheets

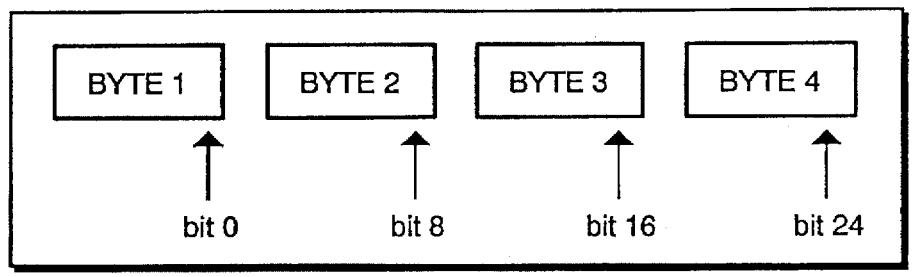

FIG. 2A

| WORD ORDER | DESCRIPTION |
|---|---|
| 1 | RAM TEST CONTROL WORD. |
| 2 | PARAMETERS LOAD ADDRESS |
| 3 | PROGRAM LOAD ADDRESS. |
| 4 | PROGRAM SIZE (IN WORDS) |
| 5 | PROGRAM CHECKSUM (32 bit) |
| 6 | PROGRAM RUN ADDRESS |
| 7 | RESERVED FOR FUTURE USE. |
| 8 | RUN TIME PARAMETERS SIZE (IN WORDS) |
| 9 THROUGH n | RUN TIME PARAMETERS |

FIG. 2B

| BIT | DEFINITION |
|---|---|
| 0-1 | TEST ALTERNATIVES:<br>00 = NO TEST<br>01 = MINIMUM RANGE (PROJECT DEFINED)<br>10 = MEDIUM RANGE (PROJECT DEFINED)<br>11 = MAXIMUM RANGE (PROJECT DEFINED) |
| 2 | DEVICE TO TEST<br>0 = ON BOARD RAM<br>1 = OFF BOARD RAM (i.e. SIMM) |
| 3-5 | UNASSIGNED |
| 6 | REPEAT TEST<br>0 = DON'T REPEAT<br>1 = LOOP FOREVER IN RAM TEST |
| 7 | PARITY BIT. (EVEN PARITY) |
| 8-31 | UNASSIGNED |

FIG. 3

METHOD FOR DOWNLOADING SPECIAL CODE FROM A COMPUTER TO A HARD COPY APPARATUS

CROSS REFERENCE TO RELATED APPLICATION

This is a continuation of application Ser. No. 08/543,835 filed on Oct. 16, 1995, now abandoned, which is a continuation of application Ser. No. 08/260,122 filed on Jun. 15, 1994, now abandoned.

FIELD OF THE INVENTION

The present invention relates generally to computer peripherals, more particularly to a program code download interface, and, more specifically, to a process for transferring special program codes to a target device using standard hardware ports and having the target device execute the routines embedded in the program.

BACKGROUND OF THE INVENTION

As the modern, post-industrial age shifts into the burgeoning management information systems age, computer automation of manufacturing, business services, government, military and other post-industrial societal needs require more reliable computer systems. As computer systems and networks develop in speed and complexity, there is an increased need for means to maintain those systems in both operationally stable. Moreover, computer network products must be reliable and easily upgradeable to match improvements in host computers and network servers. This is particularly true for computer peripherals, such as hard copy devices like printers and plotters that tend to evolve for universal application with fewer and less radical generation changes than their host computers.

A computer peripheral, for example, a printer, is generally equipped with a controller board adapted to interface with its host computer. The controller board is provided with a certain predetermined program routines, usually in the form of read only memory (ROM) and random access memory (RAM), for performing the host-peripheral interface functions and for controlling and driving the printer engine (as used in the art, engine generally is an all inclusive term used to refer to the various interactive components of the machine, such as the print media and printhead transport mechanisms, read-write devices, service stations, and the like, which are contained within the peripheral apparatus itself). The electronic circuitry comprising the controller board that is responsible for the running of the code is referred to as the formatter.

Various domains involved in product introduction and life cycle require the formatter to run special program code not written into the on-board ROM. Presently, there exists a variety of methods across products and functions for meeting this need.

For example, in the field of mass data storage in the form of magnetic tape drives, in order to maintain a reasonable commercial cost, rather than building self-diagnostic programs into each unit, diagnostic test routines are provided on a special magnetic tape which is loaded into the drive and operated from the host computer. Other products use ROM replacement to change or replace program codes.

The lack of consistency of diagnostic and product upgrade methods and equipment causes inefficiencies that hamper the ability of an original equipment manufacturer to respond quickly to changing needs of end users of the product.

Therefore, there is a need for providing a consistent platform for introducing special code into formatters.

SUMMARY OF THE INVENTION

In its basic aspects, the present invention provides a process for loading an off-board program into a computer peripheral apparatus, having a random access memory device, connected to a host computer via a standard interface port. The process includes the steps of: applying power to the device, initializing the device to achieve minimal operational conditions, testing the interface port for a signal indicative of a host computer to peripheral apparatus program download request, and upon receiving the download request, configuring the random access memory device to receive the program via the interface port, providing a signal indicative of readiness to receive the program, receiving the program in the random access memory device, and running the downloaded program. If the download request is not recognized, the device is fully initialized to its normal state of readiness for receiving common commands from the host computer.

It is an advantage of the present invention that it provides consistency to the process of introducing special code into a formatter.

It is another advantage of the present invention that it reduces manufacturing cost and time to market for all applications that require the execution of firmware code not built into on-board ROM.

It is yet another advantage of the present invention that it maximizes the leverage of software and hardware tools across product lines and process domains.

It is still another advantage of the present invention that it eliminates the need for additional components, such as plug-in cartridge devices or SIMM circuits, to process routines not requisite to the basic functionality of a computer peripheral apparatus.

It is a further advantage of the present invention that the process uses a standard port of the computer peripheral for special program input-output communication.

It is still a further advantage of the present invention that it provides a low cost, uniform method of product testing and field upgrade programming available over entire product lines.

It is yet a further advantage of the present invention that it provides high flexibility in product development and repair in that manufacturing can develop and modify test codes which can be delivered to the manufacturing process or service engineers in the field.

Other objects, features and advantages of the present invention will become apparent upon consideration of the following detailed description and the accompanying drawings, in which like reference designations represent like features throughout the FIGURES.

DESCRIPTION OF THE DRAWINGS

FIG. 2A shows byte ordering for a Centronics interface handshake four byte word used in accordance with an exemplary embodiment of the present invention as shown in FIG. 1.

FIG. 2B is a special code download parameter list format for the exemplary embodiment of the present invention as shown in FIG. 1.

FIG. 3 is a format for a Test Control Word for the exemplary embodiment of the present invention as shown in FIG. 1.

DETAILED DESCRIPTION OF THE INVENTION

Reference is made now in detail to a specific embodiment of the present invention, which illustrates the best mode presently contemplated by the inventor(s) for practicing the invention. Alternative embodiments are also briefly described as applicable.

It is common for computer peripherals to have one or more input-output ports. These ports have been standardized by industry, such as the RS232 serial port, the Centronics parallel port, the infrared communication port, and the like. By way of exemplary embodiment and not to be considered as a limitation of the scope of the invention as set forth in the claims hereinafter, the present invention will be described with respect to a computer printer connected to a personal computer by a cable connecting Centronics ports of each device. The present invention provides the ability to download special code resident in the host computer into the printer's random access memory via the Centronics port during the power-on process, also commonly known as the boot-up routine. For example, during research and development of prototypes or during manufacturing test cycles, such special code may be a prototype firmware development code, a diagnostic test code, a manufacturing test code, an integration process code, or the like. By incorporating the present invention into the printer, not only the research and development prototype products, but also the installed base of product among end users can be subjected to special code developed for diagnostic testing. To further the explanation of the exemplary embodiment, a diagnostic test code will be designated as special code of interest.

Figure 1A:
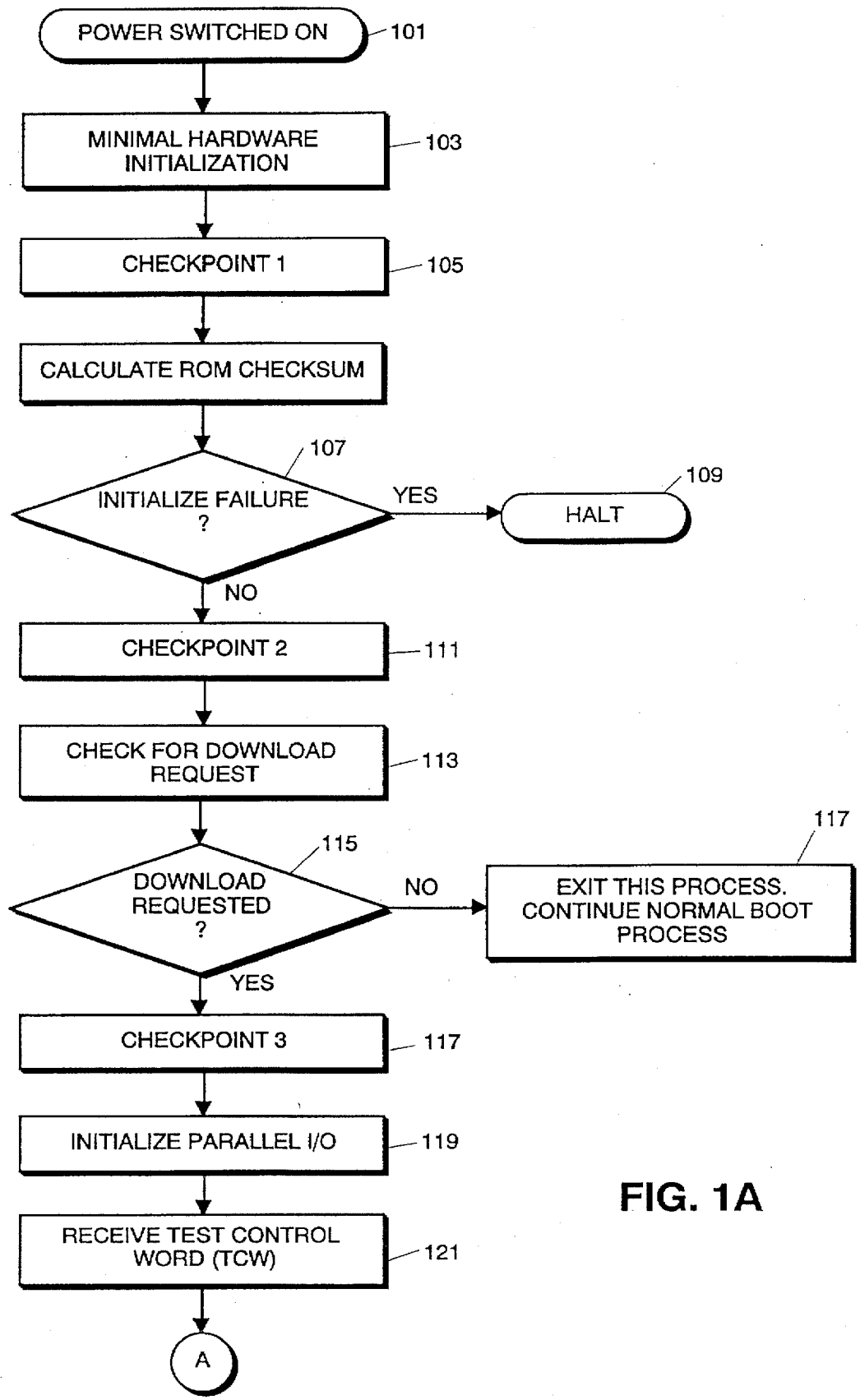
FIGS. 1A–1C are flow charts of the method of the present invention.
Figure 1B:
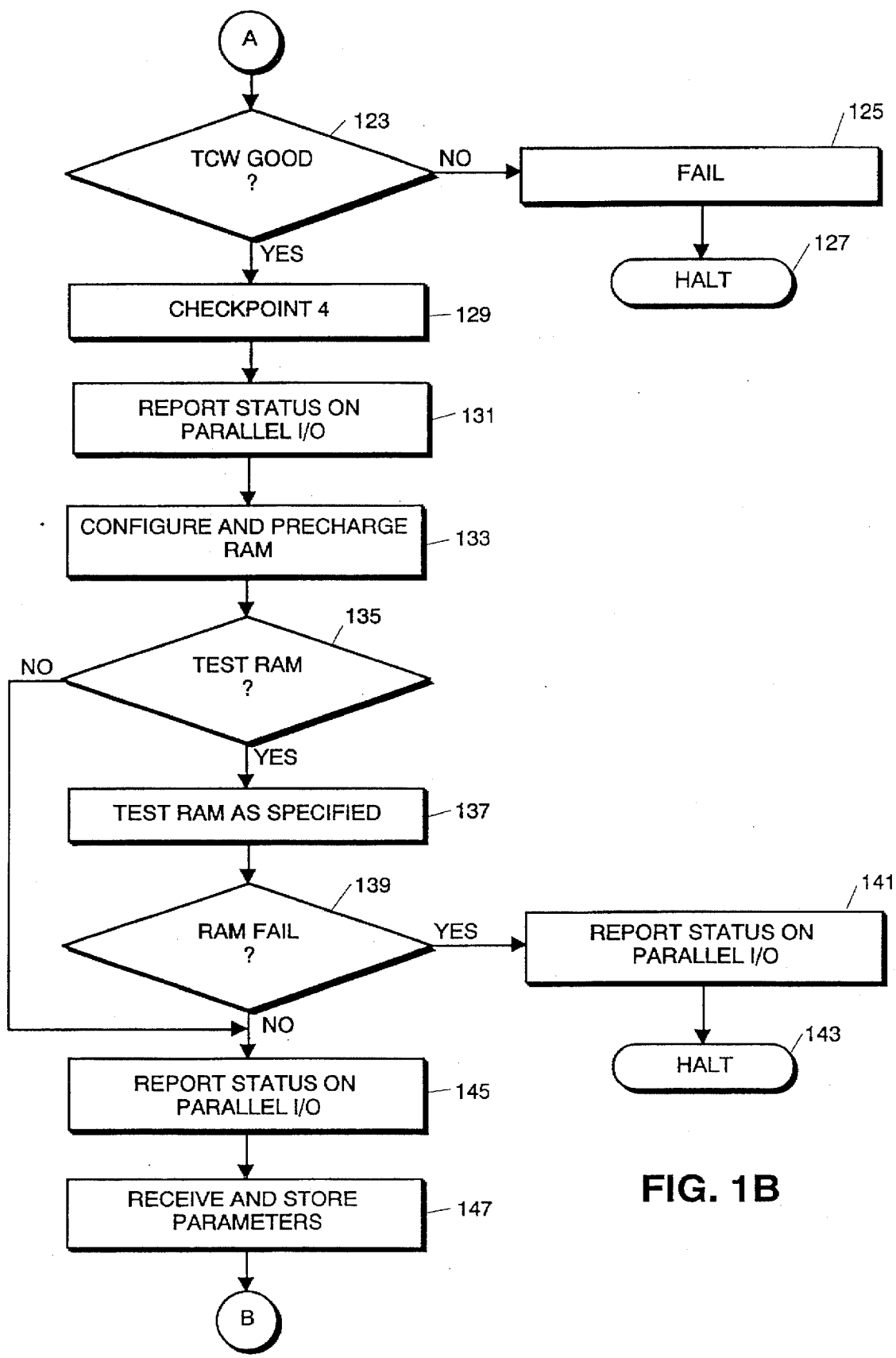
Figure 1C:
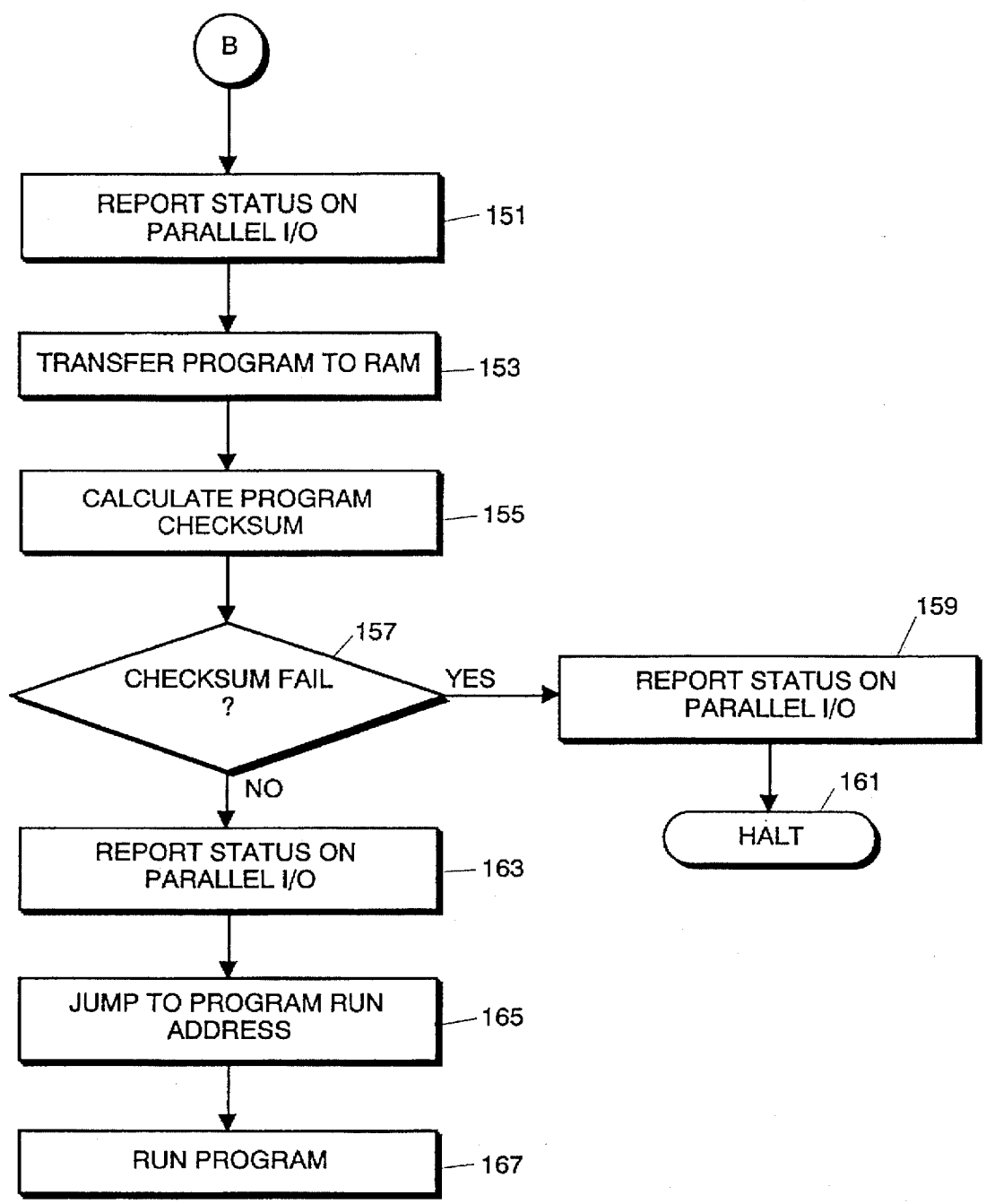

Referring now to FIG. 1, as shown in the first step 101, the process of the present invention begins when power is first applied to the printer. As with any computer peripheral, a printer has a normal boot-up procedure which generally includes routines such as self-test of various engine components followed by putting the printer into a READY mode for operating in accordance with commands from the host computer. Referring to step 103, in accordance with the present invention, only those portions of the printer essential as a minimum to implementation of the present invention are initialized. That is, for some products, a formatter may boot-up in a state that allows it to execute code without interruptions or further configuration, while other products may need to perform some simple tasks such as disabling interrupt commands. The goal is to save time by initializing only those components essential to running the diagnostic test code. By limiting the number of formatter resources initialized, the risk of having a system-wide failure should some function not be operating correctly is greatly reduced.

In the preferred embodiment, a system of checkpoints is spaced throughout the special code download interface steps of the process, such as a first checkpoint 105 following minimal hardware initialization 103. These checkpoints provide a method of tracking the special code download interface progress should the formatter hang-up due to a hardware failure. For example, the formatter can indicate having reached a checkpoint by strobing signals identified in a product's engine interface specification that can be monitored. Each time the formatter reaches a new checkpoint in the process, the monitored signal changes state. A failure between checkpoints can be determined by having a different engine interface specification signal change states. In other words, one signal will indicate checkpoints successfully reached and the other will indicate a failure.

An alternative approach is to have one signal strobed a different number of times, one for a successful checkpoint transition and another to indicate a failure. Since the engine interface may vary from product to product, the actual signals used for indicating checkpoints can be agreed upon by the involved firmware, hardware, and manufacturing engineers implementing the present invention in a specific application. The engine interface specification for a product needs to state that the engine is to ignore signals from the formatter until the formatter has signaled that the interface should be enabled.

Having reached the first checkpoint 105, a determination 107 as to whether there has been an initialization failure 107 is handled. If there has been a failure, the process is obviously brought to a halt 109. If there has been no failure, the process can proceed, passing the second checkpoint 111.

The host from which the special code is to be downloaded has been used to produce a signal or set of signals on the standard interface port connecting the host to the printer. The signal should be designed such that such a signal is unlikely to be encountered in a real-time normal operating mode condition. While the printer is performing the minimal hardware initialization and check, the formatter checks the input-output port for this special code download request 113.

If there is no host computer generated download request 115 within a time period allotted by the formatter, the process is discontinued. The normal boot-up process 117 is continued until the printer has achieved its normal operation READY state.

The timing needs of the special code download interface can easily be satisfied through the use of instruction loops. This allows product engineering teams to fine tune the interface for each product. Additionally, this approach offers the advantage of utilizing a minimal amount of the formatter's resources which helps to avoid a formatter hang-up due to a hardware failure.

If a download request 115 is detected by the formatter on the input-output port of the printer, a third checkpoint 117 has been reached and an appropriate signal strobe generated. The formatter initializes the input-output port 119 by acknowledging the download request by manipulation of the input-output signals, sending an acknowledgement back to the host computer. With this host-to-printer handshake complete, the formatter enters a normal, on-line operational state. That is, the formatter is ready to receive the special code—in this exemplary embodiment, the diagnostic routines—from the host computer.

Generally, the host computer uses a normal Centronics handshake when sending the download parameters to the formatter. Each four byte word is sent in the order as shown in FIG. 2A. The download parameter list is a variable length record whose size depends on whether optional RUN TIME parameters are present. The download parameter record has the format as shown in FIG. 2B.

Referring back to FIG. 1, once the input-output port has been initialized 119, the host computer sends a Test Control Word 121 ("TCW" hereinafter). This TCW is used to set up particular tests of the printer random access memory ("RAM" hereinafter) availability and functionality. That is, the printer RAM itself can be tested to isolate most RAM defects. A high degree of confidence that a program code downloaded into RAM will run correctly is obviously desirable.

An exemplary TCW is shown in FIG. 3. The test alternatives are likely to vary from product to product, so it is to be expected that the actual definition of the parameters of the TCW will be set for each product by the involved firmware, hardware and manufacturing engineers. In the exemplary embodiment, RAM testing only occurs if the Bit 0-1 field is selected at a value not equal to 00=No Test. Choosing to not test RAM might be appropriate in cases of retesting a printer known to have functional RAM. Retesting might occur after repairing or replacing a failed memory component of the printer. The previously downloaded test code may have found the earlier failure.

As shown in FIG. 1, if the TCW is not recognized 123, a failure is noted 125 and the process is halted 127. If the TCW is recognized, a fourth checkpoint indication is sent 129 and the host computer is notified 131 via the input-output port connection.

The host computer thus has options of identifying which RAM it wants to test, for example, formatter on-board RAM or an off-board RAM (a good alternative when the state of the on-board RAM is questionable) and, whether to skip the RAM test altogether.

The RAM is then configured and precharged 133 to enable performance of the test selected by the TCW. As will be recognized by a person skilled in the state of the art, such routines are common, generally in on-board formatter firmware code. The exact nature of each RAM test itself is peripheral device specific and can be agreed upon by the involved firmware, hardware, and manufacturing engineers. Moreover, as shown in FIG. 3, the TCW Bit 6 can be used to place the printer into a looping RAM test which would only be cleared by rebooting the printer, for example, as part of a lifecycle test program. A decision is made 135 whether or not to proceed with the RAM test. The host computer then affirms or denies. If the host computer selects to proceed with a RAM test, then the RAM is tested 137 in accordance with the parameters of the TCW. If a failure is detected 139, the failure is reported to the host computer 141 via the input-output port connection and the process is halted 143. If the host computer chooses not to test RAM or if the test is completed successfully, the status is reported 145 via the input-output port connection to the host computer and the process can continue.

The host in acknowledging the end of the RAM test then provides 147 the printer formatter with appropriate download parameters, such as address and size of RAM space where the special code and its run time parameters are to be stored. The formatter acknowledges 151 when it is ready to receive the special code. The special code is then downloaded 153 from the host computer into the printer's specified RAM.

After the program is downloaded into RAM, a CHECKSUM is calculated 155 (as would be known in the art). The calculated CHECKSUM must match 157 the Program CHECKSUM parameter before control is passed from the formatter's ROM code to the downloaded special code program now resident in the printer RAM at the previously designated 147 RAM address. If there is a CHECKSUM mismatch, the status is reported 159 to the host computer via the input-output port connection and the process is brought to a halt 161. If the calculated CHECKSUM matches the Program CHECKSUM parameter, the status is reported 163 to the host computer via the input-output port.

The last action is to branch 165 to the address specified 147 in the special code as the PROGRAM RUN ADDRESS and pass control 167 of the formatter microprocessor to the special code that has been loaded in RAM.

Special code so downloaded would obviously report the results of the tests run to the host computer.

As described, this special code download interface provides a uniform method of test which can be simply built into and used in a variety of computer peripheral devices, yet provides great flexibility as to the special code to be downloaded from the host computer.

Moreover, the process of the present invention can be readily adapted to production product upgrades. For example, rather than standard ROM memory, the computer peripheral may employ electrically erasable programmable read only memory (EEPROM). Erasing and rewriting the program becomes more convenient than physical replacement with a new ROM in the field. Similarly, computer peripherals often comprise a node on a network. The polling of a download request by the peripheral is as easily accomplished during boot-up onto the network as from a single host computer. As will be recognized by a person skilled in the art, the networked peripheral with EEPROM programming can also be reconfigured for different operating system compatibility using the present invention.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application to thereby enable others skilled in the art to understand the invention for various embodiments and with various modifications as are suited to the particular use contemplated. It is intended that the scope of the invention be defined by the claims appended hereto and their equivalents.

What is claimed is:

1. A computerized method for downloading and implementing special program code from a general purpose host computer to a hard copy apparatus, said hard copy apparatus having programmable memory means and a predetermined boot-up routine program, said hard copy apparatus further having an input and output connected to said general purpose computer via a standard interface port means, said method comprising the steps of:

storing special program code adapted for use with said hard copy apparatus in a memory device of said general purpose computer;

applying power to said hard copy apparatus;

in response to said step of applying power, initializing said hard copy apparatus by running an initial segment of said boot-up routine program to achieve minimal operational functionality;

via said boot-up routine program, said hard copy apparatus performing a check of said standard interface port means for at least one signal from said host computer indicative of a host computer request to download said special program code from said host computer to said hard copy apparatus; and upon receiving said request to download said special program code, configuring said programmable memory means of said hard copy apparatus to receive said special program code across said standard interface port means;

receiving said special program code from said host computer via said standard interface port means into said programmable memory means; and running at least a portion of said special program code via said programmable memory means prior to continuing said boot-up routine.

2. The method as set forth in claim 1, further comprising the step of:

following said step of testing said standard interface port means, when no signal indicative of a request to download program code is received, discontinuing said method and continuing said boot-up routine.

3. The method as set forth in claim 2, wherein said step of configuring said random access memory means to receive said program code via said standard interface port means further comprises:

receiving and storing operational parameters of said program code from said host computer; and providing at least one signal to said host computer via said standard interface port means indicative of readiness to receive said program code.

4. The method as set forth in claim 1, wherein said step of receiving said program code further comprises:

following recognition of said signal indicative of a download request, initializing said standard interface port means for receiving at least one control signal;

checking said standard interface port means for said control signal, including a specification of predetermined tests to be run on said programmable memory means; and configuring said programmable memory means to run said predetermined tests to be run on said programmable memory means.

5. The method as set forth in claim 4, further comprising the steps of:

providing said host computer with an option to run or to bypass said tests on said programmable memory means; and either running said predetermined tests on said programmable memory means when said host computer selects said option to run said tests; or bypassing said predetermined tests on said programmable memory means when said host computer selects said option to run said tests.

6. The method as set forth in claim 1, further comprising the steps of:

providing said host computer with a series of process checkpoint signals indicative of successful completion of individual steps of said program code.

7. The method as set forth in claim 1, wherein said step of initializing said hard copy apparatus to achieve minimal operational functionality further comprises:

initializing only components of the apparatus essential as a minimum to implementation of subsequent steps of said program code.

8. The method as set forth in claim 1, wherein said step of configuring said programmable memory means to receive said program code via said standard interface port means further comprises:

providing to said host computer via said standard interface port means at least one signal indicative of readiness to receive said program code.

9. The method as set forth in claim 1, wherein said step of configuring said programmable memory means to receive said program code via said standard interface port means further comprises:

receiving and storing operational parameters of said program code from said host computer; and providing at least one signal to said host computer via said standard interface port means indicative of readiness to receive said program code.

10. The method as set forth in claim 9, wherein said step of receiving and storing operational parameters of said program code further comprises:

storing a program code checksum, calculating a checksum during said step of receiving said program code in said random access memory means, and prior to said step of running said program code, comparing said calculated checksum with said stored program checksum and running said program code only if said comparison provides a match.

11. A computerized method for transferring a printer test program adapted to be stored in a memory device of a general purpose host computer from said computer to a printer connected to said host computer via standard interface port means and running said test program prior to fully executing a predetermined printer initialization routine stored in a programmable memory means of a standard controller means of said printer, comprising the steps of:

using said printer test program to generate a download request signal output from said host computer on said standard interface port means indicative of readiness to download said printer test program;

initiating the following steps automatically by turning said printer from a power off condition to a power on condition:

running said initialization routine only to an extent necessary to achieve a predetermined minimal printer functionality level of operation, including to check said industry standard interface means for a download request signal, indicative of a request by said host computer to download said test program to said programmable memory means of said printer; and in the event of presence of said download request signal, preparing said programmable memory means to receive said test program, acknowledging said download request signal via said industry standard interface means, downloading said test program into said random access memory means, and running said test program; or in the absence of said download request signal, continuing the remainder of said predetermined initialization routine.

12. The method as set forth in claim 11, wherein said step of preparing said random access memory means to receive said test program further comprises:

initializing said industry interface means at said printer to receive a predetermined signal indicative of parameters of said test program to test said random access memory means;

receiving from said host computer and confirming receipt to said host computer said predetermined signal indicative of parameters of said test program to test said random access memory means;

configuring said random access memory means in accordance with said parameters; and running said test program to test said random access memory means.

13. The method as set forth in claim 12, wherein said step of running said test program to test said random access memory means further comprises:

initially providing said host computer via said industry standard interface means with a signal indicative of a host computer controlled option to run or to bypass said test program to test said random access memory means;

waiting for said host computer to provide a signal via said industry standard interface means indicative of a selected said option; and continuing said method in accordance with said signal indicative of a selected said option.

14. The method as set forth in claim 12, wherein said step of downloading said test program into said random access memory means further comprises:

receiving and storing a signal indicative of the parameters for storing said test program;

configuring said random access memory means in accordance with said parameters for storing said test program;

providing a signal via said industry standard interface means to said host computer indicative of readiness to receive said test program; and downloading said test program from said host computer via said industry standard interface means into said random access memory means.

15. The method as set forth in claim 14, wherein said step of downloading said predetermined test program from said host computer via said industry standard interface means into said random access memory means further comprises:

calculating a program checksum as said test program is downloaded;

receiving a test program checksum from said host computer;

comparing said calculated program checksum to said test program checksum; and providing a signal indicative of said comparison to said host computer via said industry standard interface means.

16. The method as set forth in claim 15, wherein said step of providing a signal indicative of said comparison to said host computer via said industry standard interface means further comprises:

running said test program if said signal indicative of said comparison is a match, and halting said method if said signal indicative of said comparison is a mismatch.

17. The method as set forth in claim 11, further comprising the step of:

providing said host computer with process checkpoint signals indicative of successful completion or failure of prior steps of said test program during select individual steps of said test program.

18. A computerized program method for diagnostic testing of a computer printer, having a programmable memory means, during a boot-up routine of said computer printer using a test program adapted to be stored in a memory means of a general purpose host computer having a computer input-output port connected to a printer input-output port of said computer printer by an industry standard interface cable and port connectors, comprising the steps of:

performing a portion of said boot-up routine to attain a predetermined minimal printer functionality and to check said printer input-output port for a signal from said host computer requesting a download of said diagnostic test program;

downloading said diagnostic test program across said cable from said computer memory means into said printer programmable memory in response to said signal from said host computer requesting a download of said diagnostic test program; and performing said diagnostic testing in accordance with said diagnostic test program.

19. The method as set forth in claim 18, further comprising:

in the absence of said signal from said host computer requesting a download of said diagnostic test program, sequentially continuing said boot-up routine until said printer is in a fully operational condition.

* * * * *